Figure 1:
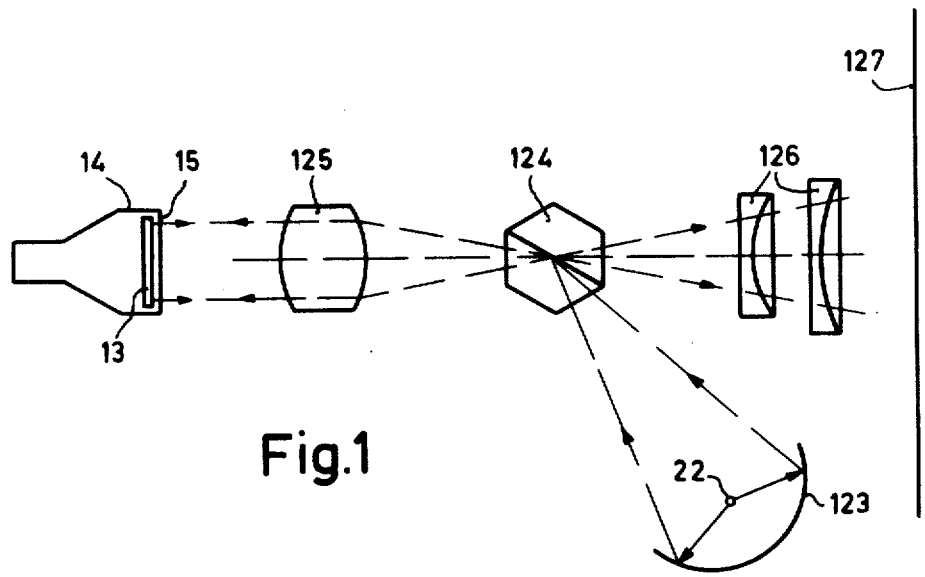

United States Patent [19]  [11] 3,893,758
Hunzinger et al.  [45] July 8, 1975

[54] DEVICE FOR PROJECTING PICTURES ON A SCREEN

[75] Inventors: Jean Jacques Hunzinger, Paris; Claude Hily, Champigny, both of France

[73] Assignee: U.S. Philips Corporation, New York, N.Y.

[22] Filed: Apr. 18, 1974

[21] Appl. No.: 461,873

[30] Foreign Application Priority Data
Apr. 20, 1973  France .............................. 73.14524

[52] U.S. Cl. .................. 353/20; 350/152; 353/102; 353/120; 353/122
[51] Int. Cl. .. G03b 21/14; G02b 5/30; G02b 27/28
[58] Field of Search ....... 353/20, 69, 102, 120, 121, 353/122; 350/152

[56] References Cited
UNITED STATES PATENTS
2,303,906  12/1942  Benford et al. ..................... 350/152

FOREIGN PATENTS OR APPLICATIONS
94,805  10/1969  France

Primary Examiner—Richard E. Aegerter
Assistant Examiner—Steven L. Stephan
Attorney, Agent, or Firm—Frank R. Trifari; Simon L. Cohen

[57] ABSTRACT

A device for projecting pictures on a screen comprising an electro-optical plate the birefringence of which is controlled by means of an electric charge pattern. In order to prevent that the phase shift of the polarized light is influenced in an undesired manner by the projection objective, namely as a result of temperature influences, the projection objective consists of two parts. The first part is situated between the polarizer/analyser and the electro-optical plate, experiences little influence of temperature variations and determines the power of the objective. The second part is situated between the polarizer/analyser and the screen and mainly corrects for the optical errors of the objective.

4 Claims, 2 Drawing Figures

DEVICE FOR PROJECTING PICTURES ON A SCREEN

The invention relates to a device for projecting pictures on a screen comprising: a light source, a polarizer/analyser, a collimator for collimating the light of the light source on an optical relay, and a projection objective, said collimator forming part of the projection objective, the birefringence of said optical relay being controlled by an electric charge pattern.

Such a device is known from the French Patent specification No. 1,479,284, as well as from the French Additional Patent specification no. 94,805 and no. 95,336 and the French application for a Patent of addition no. 6,902,611.

The known device comprises an optical relay having a target of an electrically insulating material the birefringence of which depends upon the electric field which is parallel to the direction of propagation of the said light, as well as means for scanning a first major surface of the said target by means of an electron beam, an anode for receiving the secondary electrons emitted by the target, and an optically transparent, electrically conductive layer which is provided on the other major surface of the target, the said electrically conductive layer receiving a video signal and in this manner forming the electrode for controlling the said electric field.

In the said Patent of Addition No. 94,805 the optical relay is used for the reflection of the light supplied by an independent light source. The device comprises a polarizer on which the light emitted by the light source is concentrated, and a collimator which concentrates again the light reflected by the target on a polarizer now serving as an analyser.

In the said Patent of Addition it is stated that said collimator can fulfil the function of projection objective. Then the distance between said objective and the target differs only slightly from the focal distance of the said objective.

As a result of this the objective is present between two crossed polarizers of the device and hence on the path which is followed by the polarised light already modulated by the optical relay. This means that any arbitrary mechanical stress which may occur in the lenses of the objective under the influence of temperature variations, will result in an undesired stray polarization of the light and hence the occurrence of stray light on the projection screen so that brightness defects in the picture and also loss of contrast will occur.

In the said additional Patent application No. 6,902,611 the above-mentioned drawback is already partly prevented due to the separation of the collimator and the projection objective; the device comprises a plano-convex lens which serves as a support for the target, the objective being situated between the analyser and the projection screen. The projection objective no longer influences the reading-out of the information present on the surface of the target so that special manufacturing precautions can be avoided, in particular those relating to possibly occurring mechanical stresses.

As regards the plano-convex lens which serves as a support for the target, said lens is manufactured from a material, for example fluorine, which is chosen for its isotropic properties, its good thermal conductivity and its coefficient of expansion which does not differ much from that of the material of the target, so that no mechanical stresses occur in the lens in the case of a possible increase in temperature.

In such a device the target is always situated approximately in the focus of the projection objective. The provision of the polarizer/analyzer between the target and the said objective already requires that the object distance of the objective be large, said distance being equal, for example, to 1 to 2 times the focal distance of the objective.

The said distance should even be larger if it is necessary to place other bulky elements on the path between the target and the polarizer to be followed by the light; the said elements are, for example, dichroic filters which enclose an angle of 45° with the axis and which are used for the trichromatic screening of the light.

In that case a projection objective of the retrofocal type will have to be used the objective distance of which may be several times the focal distance.

The use of such an objective exhibits certain drawbacks due to the fact that for the same aperture the aberrations are larger according as the said distance increases.

It is the object of the invention to mitigate the above mentioned drawbacks and to provide an improvement of the device with respect to the structure of the optical system of the relay.

According to the invention, a device of the kind mentioned in the first paragraph is characterized in that the projection objective consists of two parts of which a first part is situated between the polarizer/analyzer and the optical relay and determines the power of the projection objective and the second part of which is situated between the polariser/analyser and the screen and corrects for optical errors of the projection objective.

The components of the first part of the projection objective are preferably manufactured from the same optical material, for example, silicon oxide, having a small coefficient of thermal expansion.

A particular embodiment of a device according to the invention serves to display colored pictures and comprises three optical relays each for displaying one primary colour and is characterized in that the second part of the projection objective is common to the three primary colors.

Figure 2:
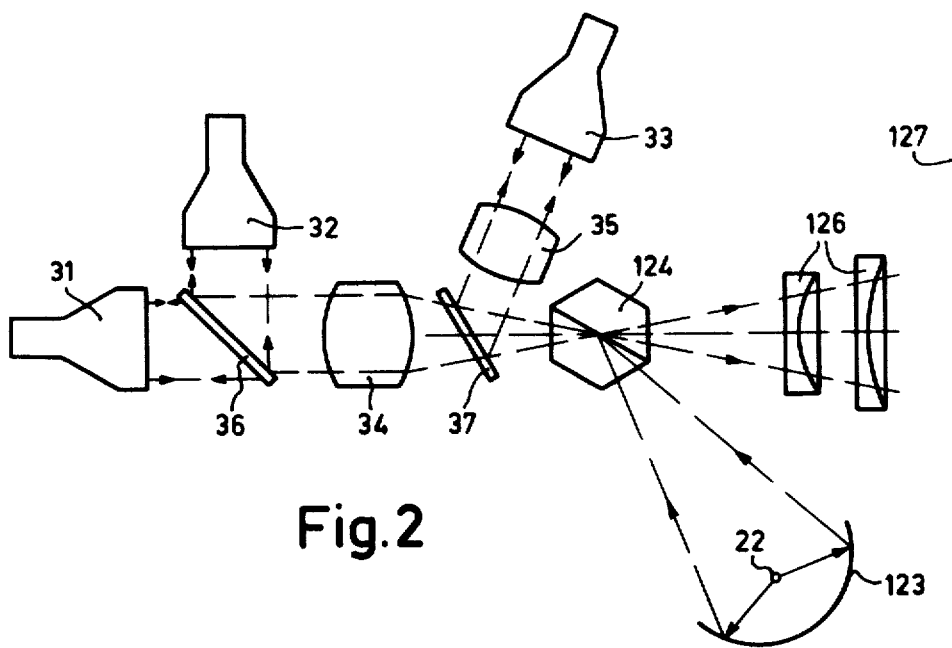

The invention will be described in greater detail with reference to the accompanying drawing, in which FIG. 1 shows a device for projecting pictures in one color, and FIG. 2 shows a device for projecting in three colors.

Referring now to FIG. 1, reference numeral 14 denotes the cathode ray tube of the optical relay. The target in the form of a plate $KD_2PO_4$ material exhibiting the electro-optical Pockels-effect, is parallel to the input window 15 of the tube and is denoted by 13. Said tube comprises in addition all the elements which are indicated in the above-mentioned French Patent specification No. 1,479,284, in particular the elements of the cooling system which were not shown for clarity of the drawing. The light is supplied by means of a source 22 and a mirror condenser 123. The light is concentrated on the polarizer 124 near one of the foci of the optical system 125 which is present between the polarizer 124 and the target 13 and which serves for the collimation of the light originating from the polarizer on the birefringent target 13 of the optical relay.

The polarizer 124 is shown in the form of a Wollaston prims. According to the invention it is possible, of course, that said polarizer is in another form.

The light, returning from the target 13, again passes in the polarizer 124 now serving as an analyzer. The optical system 126 which is formed by two partial systems and which is placed between the polarizer/analyzer 124 and the screen 127 is combined with the optical system 125 to form in this manner a corrected projection objective.

According to the invention, the construction of said system 125 is such that it can be traversed by a considerable beam of light energy without giving rise to mechanical stresses in the glass which might cause a certain depolarization of the light prior to analysis of the double refraction effect of the target by means of the analyzer 124.

For that purpose, the components constituting the optical system 125 are constructed from the same material having a small coefficient of thermal expansion, for example, silicon oxide ($SiO_2$).

As a result of the exclusive use of the same material for realizing the whole system 125, however, it is not possible to correct for the color aberrations. Said correction occurs by means of the optical system 126. Since said system is present between the polarizer and the screen, its influence on the polarization state of the light emitted by the target is no more of interest. In this manner it is admissible that the said system 126 is subject to mechanical stresses which occur when said system is traversed by a large light beam, which enables the use of various types of glass to realize the system 126.

The invention uses the possibility of ensuring the correction of color aberrations of the optical system 125 by means of the optical system 126.

In particular, the optical system 126 may be formed by a non-focal combination with a magnification equal to 1 or differing from 1 and comprising two elements each of which is formed by a "flint" lens and a "crown" lens.

The projection objective which is formed by the optical systems 125 and 126 may be constructed in the manner as described in French Patent specification No. 2,141,525, in which the converging part (125) of the objective is of silicon. According to the invention, in particular the objective distance of the optical system 125 is large, namely considerably larger than the focal distance.

There exists a large distance between the target 13 and the optical system 125 in such manner that other optical elements can be placed between said components, for example, light filters which, for example, operate selectively in accordance with the wavelength.

According to the invention this possibility is used to form a television color picture projector by means of three relays of the type described in the main patent.

FIG. 2 shows the principle of such a projector. Said projector comprises three relays 31, 32, 33, the light source 22, the optical system 123 to receive the light, and the polarizer 124, all elements having already been referred to in FIG. 1, and the optical elements 34 and 35 of the same type as the optical system 125.

On the path followed by the light emanating from the polarizer 124, dichroic filters which operate selectively in accordance with the wavelength have been placed between the target and the polarizer. One of the said filters, namely the filter 37, which encloses an angle with the optical axis and which is placed between the optical element 34 and the polarizer 124 reflects the blue light of the spectrum to the optical element 35 and passes the green light and the red light.

The other filter 36 reflects the red light of the spectrum to the relay 32 and passes the green light to the relay 31. The way in which the various elements have been provided is such that the targets of the relays on the one hand 31 and 32 and on the other hand 33 are present in the foci of the respective elements 34 and 35 which ensure the collimation of the respective green, red and blue light components of the spectrum.

After being modulated by the targets, the blue, green and red light components recombine in the common part of the optical system which is formed by the polarizer/analyzer 124 and the optical system 126 which forms a correction lens for the optical elements 34 and 35.

What is claimed is:

1. A device for projecting pictures on a screen comprising: a light source, a polarizer/analyzer, a birefringent optical relay, a collimator for collimating the light of the light source on said optical relay, said collimator comprising a first projection objective element, the birefringence of said optical relay being controlled by an electric charge pattern, said first objective element being situated between the polarizer/analyzer and the optical relay, and a second objective element situated between the polarizer/analyzer and the screen and correcting for optical errors of the first projection objective element, said first objective element determining the power of the projection device.

2. A device as claimed in claim 1, wherein the first objective element comprises a plurality of components, all the components of the first projection objective element being manufactured from the same optical material having a small coefficient of thermal expansion.

3. A device as claimed in claim 2, wherein the first projection objective element is manufactured from silicon oxide.

4. A device as claimed in claim 1 for displaying colored pictures and comprising three optical relays each for displaying one primary colour, wherein the second projection objective element is common to the three primary colors.

* * * * *